Dec. 2, 1969 S. A. STEELMAN 3,481,551

ENDLESS TAPE CARTRIDGE

Filed July 18, 1966

INVENTOR.
STUART A. STEELMAN

BY

Dick, Zarley, McKee & Thomte

ATTORNEYS 3,481,551
Patented Dec. 2, 1969

3,481,551

ENDLESS TAPE CARTRIDGE

Stuart A. Steelman, 7009 Bellaire Ave.,
Des Moines, Iowa 50311

Filed July 18, 1966, Ser. No. 565,763
Int. Cl. B65h *59/08;* G11b *23/02*
U.S. Cl. 242—55.19 13 Claims

ABSTRACT OF THE DISCLOSURE

An endless tape cartridge comprising a housing with a rotatable turntable mounted therein. An endless reel of tape is mounted on the turntable, with a fine helical groove in the turntable uniformly supporting the convolutions of the tape so that a spring clip can bear down against the upper side of the reel of tape which is maintained in a level plane. The reel of tape has an exposed loop which is comprised of a first portion that departs from the center of the reel and which crosses over a second portion which enters the outer periphery of the reel. The tape has a recording coating on one side and a lubricant coating on the other side, and is arranged so that the lubricant coating absorbs the frictional wear as the loop portion departs from the center of the reel of tape. A tape cleaning and tensioning element cleans the recording coating of the exposed loop portion, and maintains uniform tension on the tape as it passes therefrom.

Endless tape cartridges of the magazine type are commonly used in conjunction with record/playback instruments as a means of providing recorded music, announcements, and the like. These cartridges consist generally of a housing having a turntable rotatably mounted therein upon which the endless coil of magnetic tape is wound. Many endless tape cartridges have been designed in an attempt to provide an easily handled, low friction, distortion free, long lived recording medium for use with these record/playback instruments. However, these cartridges have been largely unsatisfactory. Prior to the device disclosed herein there have been no endless tape cartridges which provide a constant tape tension control to insure intimate contact between the magnetic tape coating and the record/playback head. Prior devices require the use of pressure fingers and pads for this purpose. Pressure pads cause excessive head and tape wear as well as inconsistent tracking and tape alignment, resulting in wide variations in recording fidelity. Likewise, the devices presently available create excessive distortion in the recorded sound, specifically in the form commonly described as flutter. Further, existing devices fail to provide means for continuous cleaning of the tape surface in order to prevent dirt deposits from accumulating on the record/playback head with consequent loss of fidelity.

A further object of this invention is to provide an endless tape cartridge having a turntable provided with a helical groove formed therein.

A further object of this invention is to provide an endless tape cartridge having a turntable configuration which greatly reduces the friction on the innermost convolution which is being pulled from the tape reel.

A further object of this invention is to provide an endless tape cartridge wherein the configuration of the exposed tape loops aid in greatly increasing the useful life of the cartridge tape.

A further object of this invention is to provide an endless tape cartridge having a tape tensioning device therein which not only acts as a flutter filter but also wipes and cleans the tape surface to prevent accumulation of dirt on the record/playback head.

A further objetc of this invention is to provide an endless tape cartridge which has a clip spring means yieldably engaging the top of the tape reel to prevent the layers of tape from moving upwardly and also aiding in equally distributing the static charge thereof.

A further object of this invention is to provide an endless tape cartridge having a clip spring means thereon which yieldably engages the top of the tape reel to function as a turntable brake to prevent rotation thereof during shipping and handling.

A further object of this invention is to provide an endless tape cartridge which is economical of manufacture, durable in use, refined in appearance, and capable of being used in conjunction with a wide variety of record/playback instruments.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figures 1, 2, 3, 4, 5, 6, 7:
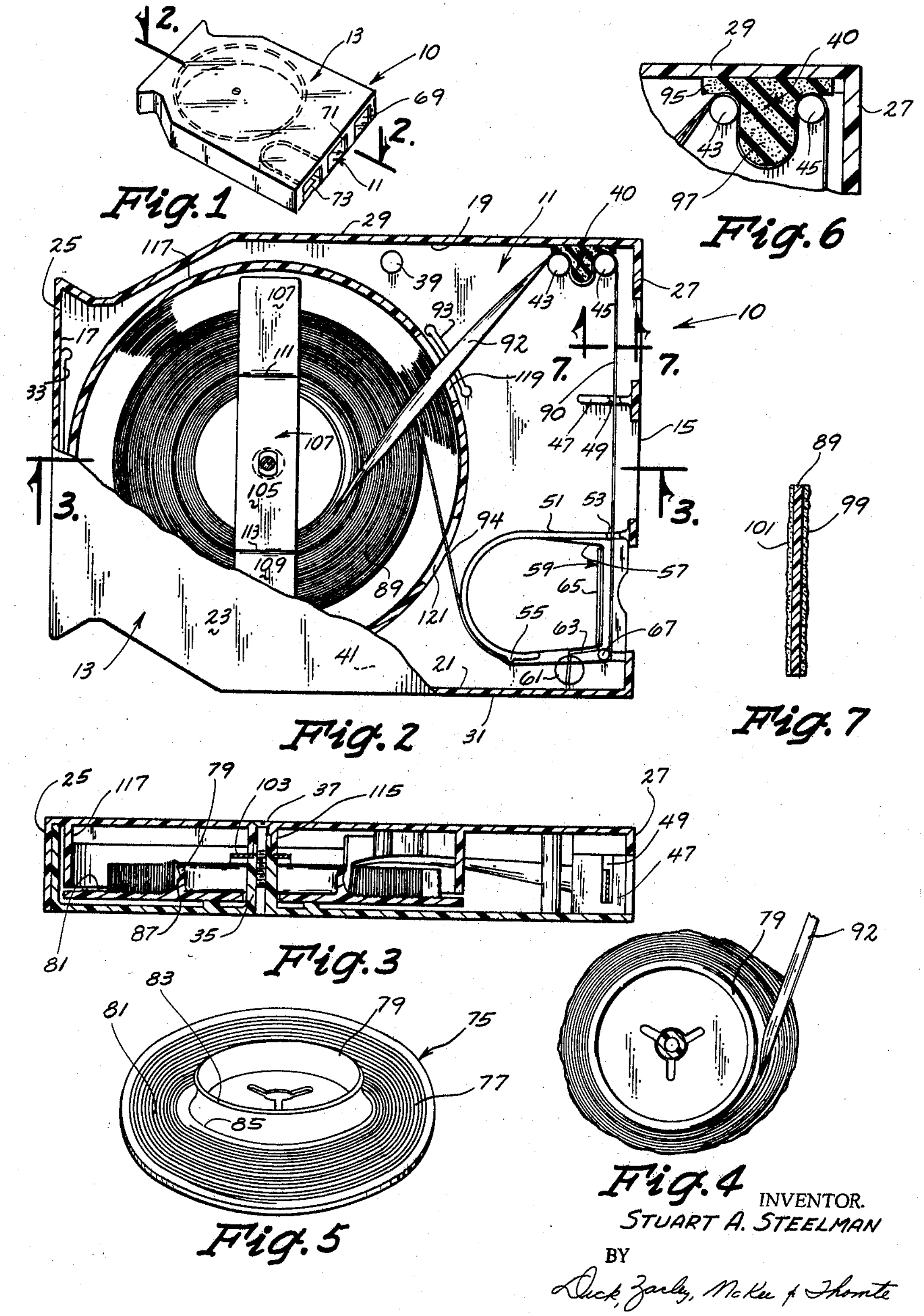
FIG. 1 is a perspective view of the cartridge.
FIG. 2 is a top view of the cartridge with a portion thereof cut away to more fully illustrate the invention.
FIG. 3 is a sectional view as would be seen on line 3—3 of FIG. 2.
FIG. 4 is a fragmentary top view of the tape reel illustrating the elliptical shape of the innermost tape convolutions.
FIG. 5 is a perspective view of the turntable of the cartridge.
FIG. 6 is a sectional view of the tensioning device within the cartridge which acts as a flutter filter and a wiper.
FIG. 7 is a sectional view of the endless tape illustrating the recording coating at one side of the tape and the lubricant coating at the other side of the tape.

The cartridge of this invention is generally designated by the reference numeral 10 and includes a base portion 11 and a cover element 13 detachably secured thereto. For purposes of description, base portion 11 will be described as having opposite ends 15 and 17 and opposite edges 19 and 21. Cover element 13 includes a top portion 23 and downwardly extending side wall portions 25, 27, 29 and 31.

A support 33 extends upwardly from base portion 11 at end 17 and is adapted to engage cover element 13 as seen in FIG. 2. Base portion 11 is provided with an upstanding spindle 35 which is internally threaded to receive a screw 37 which is adapted to penetrate an opening in cover element 13 to maintain cover element 13 on base portion 11. As best seen in FIG. 2, a pair of supporting posts 39 and 41 extend upwardly from base portion 11 adjacent edges 19 and 21 respectively which are adapted to engage cover element 13. A pair of spaced apart posts 43 and 45 extend upwardly from base portion 11 adjacent edge 19 (FIGS. 2 and 6). A tape wiping means 40 is positioned between the adjacent posts 39 and 41 and will be described more completely hereinafter. A tape guide 47 extends upwardly from base portion 11 adjacent end 15 and has opening 49 formed therein. An arcuate wall member 51 extends upwardly from base portion 11 (FIG. 2) and is provided with an opening 53 formed therein. As best seen in FIG. 2, wall member 51 is provided with an outwardly projecting ridge 55 which is adapted to engage the moving tape as it passes thereby. An opening 57 is formed in base portion 11 within the confines of wall member 51 and is adapted to receive the pinch roller or the like of the playback instrument which would extend therethrough. A spring 59 is secured at one end to an upstanding post 61 and has a slot formed therein which is adapted to receive the one end of the spring. As best seen in FIG. 2, spring 59 includes a spring portion 63 which is spaced outwardly of opening 57 in base portion 11 and a spring portion 65 which is normally positioned over opening 57 as best seen in FIG. 2. The pressure of the tape against the record/playback heads tends to move the cartridge to the left as viewed in FIG. 2 and spring 59 acts as a counter-force against this movement.

A tape guide post 67 extends upwardly from base portion 11 adjacent opening 57 as seen in FIG. 2. Cover element 13 is provided with cut-outs 69, 71 and 73 formed in wall portion 27 to accommodate the transducer heads, capstan and pinch roller of the record/playback instrument.

A turntable 75 is rotatably mounted on spindle 35 and includes a disc portion 77 and a central hub portion 79. Disc portion 77 is provided with a single continuous helical groove 81 formed therein. As best illustrated in FIG. 3, central hub portion 79 has an exterior surface which is curved in cross-section and includes an upper end 83 and a lower end 85. Lower end 85 terminates in a plane outwardly of upper end 83 which creates a void space 87 therebetween.

An endless tape 89 is mounted on turntable 75 and has an exposed loop portion 90 as clearly illustrated in FIG. 2. The tape 89 departs from the inner portion of the reel of tape, passes over guidepost 93 which extends upwardly from base portion 11, thence around post 43, around wiping means 40, around post 45, thence through opening 49 in post 47, thence through opening 53 in wall member 51, thence around post 67, past protrusions 55, and then back onto the reel of tape. It can be seen from FIG. 2 that the departing tape portion 92 passes over the arriving tape portion 94.

Wiping means 40 consists of a base portion 95 and a substantially U-shaped portion 97 extending therefrom between posts 43 in FIG. 5 as seen in FIG. 6. Preferably, wiping means 40 should be of a polyurethane material or the like. Cover element 13 is provided with a downwardly extending wall member (not shown) which would engage the upper end of wiping means 40 to assist in positioning the same. Tape 89 is comprised of any suitable material but as seen in FIG. 7 is provided with a coating of dry lubricant 99 at one of its sides and is provided with a recording coating 101 at its other side. Preferably, coating 99 should be comprised of a dry graphite material and recording coating 101 should be comprised of an iron oxide material.

A spring clip 103 is mounted on spindle 35 above the reel of endless tape. Spring clip 103 includes a base portion 105 and end portions 107 and 109. Spring clip 103 is bent downwardly at 111 and 113 so that end portions 107 and 109 are in a horizontal plane below base portion 105. Base portion 105 is provided with an opening formed therein which is adapted to receive the upper end of the spindle 35. As seen in FIG. 3, cover element 13 is provided with a downwardly extending post 115 which engages base portion 105 of spring clip 103 to limit upward movement thereof. Cover element 13 is also provided with various downwardly extending posts and wall members (not shown) which would register with certain of the wall members and posts on base portion 11 to prevent the tape from moving upwardly with respect to base portion 11. As seen in FIGS. 2 and 3, cover element 13 is provided with a downwardly extending, circular wall member 117 which terminates adjacent the periphery of disc portion 77 of turntable 75. Wall member 117 is provided with an opening 119 to accommodate the departing tape portion 92 and is provided with an opening 121 to accommodate the arriving tape portion 94.

The normal method of operation is as follows: The turntable 75 preferably is constructed of a lubricating type plastic such as Delrin (trademark of DuPont). The endless tape 89 is loosely wound on turntable 75 so that the force exerted on the tape reel by the departing tape causes the inner convolutions thereof to assume an elliptical shape as best seen in FIG. 4. The elliptical shape causes the innermost convolution to be pulled away from hub portion 79 so that friction at the point of departure is minimal. It can be seen in FIG. 4 that one side of the tape 89 slides over the inner convolutions thereof as the departing tape moves over tape guide 93. However, the coating of lubricant at that side of the tape greatly reduces the friction therebetween. Any lubricant which falls from tape 89 as it slides over the inner convolution will fall into the tape reel without damage to the same. The cartridges presently available are constructed so that the recording side of the tape (which is usually coated with iron oxide) slides over the inner convolutions thereof thereby creating a substantial amount of friction therebetween. Additionally, those cartridges utilizing such a design cause iron oxide to fall from the tape into the tape reel which causes excessive wear of the tape. The cartridge disclosed herein eliminates such disadvantages.

Tape wiping means 40 acts as a tensioning device upon the tape as it passes therearound to insure a constant pull tension so that the pressure between the tape and the recording head is always constant regardless of whether the cartridge is loaded with long or short tape. The foam rubber tape wiper acts as a spring load exerting pressure against the tape in the areas where the tape bears against posts 43 and 45. Pull tension of the tape is proportional to the area of contact between the tape and the surfaces of 43 and 45. Area of contact is proportional to the degree of tape wrap around the posts. A cartridge loaded with a long length of tape requires more pull force to overcome internal friction than one loaded with a short length. As the pull force increases the foam rubber retracts from its position between the posts as shown in FIG. 6, decreasing the degree of tape wrap around the posts and decreasing the exit pull tension at the point where the tape leaves post 45. The durometer of the foam rubber is chosen so that any increase in input pull at post 43 results in a sufficient decrease in tape wrap around posts 43 and 45 so that exit pull tension is maintained constant at a level which insures proper contact between tape and record head. The tape tension is greater on the "exit" side of wiping means 40 than on the incoming side of wiping means 40. Wiping means 40 also acts as a flutter filter to dampen out small jerks or variations in tension. Previous cartridges utilized pressure pads to press the tape against the heads. However, these pads caused an excessive head wear, also caused misalignment of tape and also created noise at the recording head due to vibrations set up thereby. No previous cartridge provides means for constant tension, flutter filtering, or tape cleaning.

The helical groove 81 on disc portion 77 of turntable 75 has been discovered to eliminate friction between the tape and the turntable by as much as 60 percent. The helical groove maintains a plane surface so that constant pressure is maintained on the tape by spring clip 103 throughout each complete revolution of the turntable, eliminating tension variations. Since the helical groove is not the same curvature as the wound tape, the tape is shuffled which overcomes static electricity and reduces friction as well as maintaining the tape in a loosely wound condition. It can be seen from FIG. 3 that the lower end 83 of the hub portion 79 curves upwardly and inwardly which causes the innermost convolutions to rise slightly so that the upper ends thereof project above the upper end 81 of hub portion 79. This feature also aids in reducing friction between the tape and the hub portion of the turntable inasmuch as the only contact therebetween is a tangential contact between the outwardly curved upper end 81 and that portion of the inner convolution engaging the same. In effect, the inner tape convolutions are slightly raised so that the tape does not have to be raised quite as far at the actual point of departure.

The spring clip 103 maintains a constant uniform pressure on the top of the tape reel to prevent convolutions of tape from raising above the normal plane of the tape reel. Spring clip 103 also aids in equally distributing the static charge, which develops unequally because of the differential in velocity between the inner and outer layers of tape. Accumulation of static charge in the outer layers causes them to bind against each other causing jerky tape motion. Equalizing the static charge results in smooth tape motion. Spring clip 103 also functions as a turntable brake to prevent rotation thereof during shipping and handling.

Previous cartridges, because of various elements in their designs, have been restricted to use in conjunction with drive mechanisms having a rotatably retractable pinch roller which enters the cartridge through opening 57 in base portion 11. The shape and size of opening 57 makes it possible for this cartridge to be played on a wide variety of drive mechanisms with or without rotatably retractable pinch rollers.

Thus it can be seen that the device accomplishes at least all of its stated objectives.

Some changes may be made in the construction and arrangement of my endless tape cartridge without departing from the real spirit and purpose of my invention, and it is my invention to cover by my claims, any modified forms of structure or use of mechanical equivalents which may be reasonably included within their scope.

I claim:

1. In an endless tape cartridge for use with a playback instrument, a housing, a turntable means rotatably mounted in said housing, an endless tape reel mounted on said turntable means and hafing an exposed loop portion extending therefrom which is adapted to operatively engage a portion of the playback instrument, a resilient tape wiping means operatively secured to said housing, said tape wiping means including a substantially U-shaped portion, said exposed loop portion having a recording side engaging said U-shaped portion, said housing provided with first and second upstanding posts positioned closely adjacent to opposite sides of said U-shaped portion of said tape wiping means, said tape passing first around a portion of first post and between said first post and said U-shaped portion and thence around said U-shaped portion, thence between said U-shaped portion and said second post, and thence around a portion of said second post.

2. The cartridge of claim 1 wherein said tape engages a greater portion of the surface of said second post than said first post wherein the tape tension is greater on the exit side of said tape wiping means than on the incoming side of said tape wiping means wherein the tape tension on the exit side of said tape wiping means remains reasonably constant regardless of variations in tape tension on the incoming side.

3. In an endless tape cartridge for use with a playback instrument, a housing, a turntable means rotatably mounted in said housing, an endless reel of tape mounted on said turntable means and having an exposed loop portion extending therefrom which is adapted to operatively engage a portion of a playback instrument, said tape having a recording side, a tape cleaning means on said housing and in engagement with the recording side of said loop portion of said tape, and post elements adjacent said tape cleaning means engaging and bending said tape to guide said tape into constant operative engagement with said tape cleaning means to clean said tape and to maintain constant and uniform tension on said tape as said tape passes therefrom.

4. The cartridge of claim 3 wherein said tape cleaning means is comprised of resilient material and includes a substantially U-shaped portion, with said exposed loop portion engaging at its recording side said U-shaped portion

5. The cartridge of claim 3 wherein said tape cleaning means is compressible to dampen variations in the tension of the tape.

6. The cartridge of claim 3 wherein said tape cleaning means is comprised of porous, resilient material.

7. In an endless tape cartridge for use with a playback instrument, a housing, a turntable means rotatably mounted in said housing, and an endless tape reel mounted on said turntable means and having an exposed loop portion extending therefrom which is adapted to operatively engage a portion of the playback instrument, said tape having a recording side, said endless tape reel being comprised of a plurality of closely spaced helical convolutions of tape which are adapted to move inwardly in a helical path towards the center of said reel as said turntable is rotated, clip means on said housing and engaging the side of said tape reel opposite to said turntable, said turntable including a base portion adapted to engage and support said endless tape reel, said base portion having a helical groove therein comprised of a plurality of helical convolutions which are in supporting engagement with the convolutions of said tape reel, the convolutions of said helical groove being of a different curvature than the helical convolutions of said tape so that said tape is uniformly supported and maintained in a plane surface, whereby substantially constant pressure can be maintained on said tape reel by said clip means, a tape cleaning means on said housing and in engagement with the recording side of said loop portion of said tape, and post elements adjacent said tape cleaning means engaging and bending said tape to guide said tape into constant operative engagement with said tape cleaning means to clean said tape and to maintain constant and uniform tension on said tape as said tape passes therefrom.

8. The cartridge of claim 7 wherein said turntable means includes a base portion and an upstanding hub portion portion with an outer surface, said outer surface of said upstanding hub portion having a substantially concave shape in cross-section.

9. The cartridge of claim 7 wherein said upstanding hub portion includes upper and lower ends, the lower end of said upstanding hub portion terminating in a plane outwardly of said upper end whereby the inner convolutions of said tape will be moved upwardly above the normal plane of the tape reel.

10. The cartridge of claim 8 wherein the concave curvature of the outer surface of said upstanding hub portion creates a void between the innermost tape convolution and the upper and lower ends of said upstanding hub portion.

11. In an endless tape cartridge for use with a playback instrument, a housing, a turntable having a center hub and a tape reel supporting base rotatably mounted in said housing, a reel of endless tape mounted on said turntable, said tape having a recording coating on one of its sides and a lubricant coating on its other side, and having an exposed loop portion extending from said reel which is adapted to operatively engage a portion of the playback instrument, said exposed loop portion of said reel of endless tape including a twisted departing tape portion departing from the inner periphery of said reel and the outer periphery of said center hub, and an arriving tape portion arriving at the outer periphery of said reel, said departing tape portion crossing over the arriving tape portion, the side of said tape having a lubricant coating thereon being adjacent the outer periphery of said center hub so that any frictional reaction on said twisted departing tape portion caused by engagement with the next adjacent convolution of tape will occur on the side of said departing tape portion having a lubricant coating thereon to protect the recording coating on the other side thereof from abrasion or wear.

12. The cartridge of claim 11 wherein a tape cleaning means on said housing engages the recording coating on said exposed loop portion.

13. The cartridge of claim 3 wherein a self-contained tape tensioning and cleaning means is mounted on said housing, comprising a substantially U-shaped tape wiping portion of resilient material, and a portion of the recording side of said tape being in engagement with said U-shaped tape wiping portion of said tape tensioning and cleaning means.

References Cited

UNITED STATES PATENTS

| | | | |
|---|---|---|---|
| 2,426,838 | 9/1947 | Miller | 242—55.19 XR |
| 2,740,628 | 4/1956 | Small | 242—55.19 |
| 2,940,753 | 6/1960 | Nygaard | 242—55.19 |
| 2,964,256 | 12/1960 | Gorey. | |
| 3,030,041 | 4/1962 | Cousino. | |
| 3,241,781 | 3/1966 | Knox. | |
| 2,288,983 | 7/1942 | Weiss | 242—55.19 |
| 3,088,687 | 5/1963 | Martin | 242—55.19 |
| 3,241,781 | 3/1966 | Knox | 242—55.19 |

FOREIGN PATENTS

| | | |
|---|---|---|
| 749,804 | 5/1933 | France. |
| 1,001,967 | 8/1965 | Great Britain. |
| 1,002,123 | 8/1965 | Great Britain. |

OTHER REFERENCES

German printed application, 1,020,805, Daniel, December 1957.

BILLY S. TAYLOR, Primary Examiner

U.S. Cl. X.R.

242—71.8, 76